Jan. 30, 1968    HIDEO MATSUSHITA ET AL    3,365,938
ULTRAHIGH-SPEED TENSILE TESTER FOR POLYMER MATERIALS
Filed June 11, 1965    8 Sheets-Sheet 5

H. MATSUSHITA,
R. MORIKAWA, AND
Y. SHIMABARA
INVENTORS

BY Wenderoth, Lind & Ponack
ATTORNEYS

H. MATSUSHITA,
R. MORIKAWA, AND
Y. SHIMABARA
INVENTORS

BY Wenderoth, Lind & Ponack
ATTORNEYS

United States Patent Office 3,365,938
Patented Jan. 30, 1968

3,365,938
ULTRAHIGH-SPEED TENSILE TESTER
FOR POLYMER MATERIALS
Hideo Matsushita, Itami, Hyogo, Ryoichi Morikawa,
Sakai, Osaka, and Yoichi Shimabara, Ibaraki, Osaka,
Japan, assignors to The Toyo Rubber Industry Co., Ltd.,
Nishi-ku, Osaka, Japan
Filed June 11, 1965, Ser. No. 463,128
9 Claims. (Cl. 73—95)

ABSTRACT OF THE DISCLOSURE

An ultrahigh-speed tensile tester for elastomer materials which applies a pull to the specimen by abutting a cam having a special form of cam surface and carried by a rotary disc against a pressure-receiving pin on a movable holder which is movable along a linear guide with the pushing direction of the cam corresponding completely with the moving direction of the movable holder.

---

The pull is started by extending the cam or pressure-receiving pin at a signal from a switch which detects the rotary position of the rotary disc.

The strain on the specimen is spotted in the form of a black or bright spot on the stress-strain curve of a Braun tube, or is shown as a displacement of an X-axis on a Braun tube of an oscilloscope.

The present invention relates to an ultrahigh-speed tensile tester for elastomers such as rubber, adapted to make tests at a tension speed of above 40 m./s. with a stroke of above 500 mm.

Conventionally, in tensile testing of elastomers such as rubber, low speed tensile testers whose tension speed is of the order of at most 0.01 m./s. have heretofore been commonly used. As to conventional high speed testers, there is an impact test type machine of very short stroke, a tester which uses a rotary disc but which is incapable of pulling the specimen at uniform velocity with a long stroke, another tester which, though adapted to apply a pull by a chain or the like executing uniform linear motion, is structurally limited in speed, and other different types of testers such as those utilizing the bursting force of explosives or highly compressed air which, however, are disadvantageous in that they are unreliable in obtaining uniform velocity, have a short stroke and are difficult to operate. Thus, various high speed testers including the above-mentioned testers are known, but none of them are suitable for use as high speed tensile testers for materials of high stretchability such as rubber.

The present invention provides an ultrahigh-speed tensile tester for elastomers such as rubber, capable of applying pull to the specimen at a high tension speed of up to 40 m./s. over a distance of up to 500 mm., and has for its first object the provision of a novel arrangement wherein in order to transform uniform angular motion to uniform linear motion, a cam on a rotary disc has a driving curve which effectively produces a driving force capable of always linearly pulling a movable holder at uniform velocity in the direction of pull of the specimen, said movable holder, in turn, pulling the specimen.

Another object of the invention is to provide a novel arrangement wherein said cam is retractably mounted on a cam-driving rotary disc and the position of the driving curve formed on the cam at its cam surface is maintained in a given relation, the in-and-out movement of said cam being effected by a diaphragm mechanism.

A further object of the invention is to provide a novel arrangement wherein the specimen to be tested is held by fixed and movable holders and the movable holder is adapted to be moved along a linear guide and provided with a pressure-receiving pin driven by contact with the pressing surface of the cam, said movable holder being also provided with a safety stopper to prevent the resilient movement of the movable holder upon fracture of the specimen as the movable holder is downwardly urged at high velocity.

Another object of the invention is to provide an ultrahigh-speed tensile tester having wide range uniform dividing means capable of securing uniformity of velocity over the whole range from low to high speed values.

Yet another object of the invention is to achieve high precision in the measurement of rotative speed of the ultrahigh-speed tensile tester, wherein a multi-step reduction gear and a tachometer are used to select a voltage driving circuit to divide the generated voltage of the tachometer, which divided voltage is then fed to an electrical self-balancing meter thereby to provide easy reading with high precision of the rotative speed over the whole range of high to low speed values with said wide range uniform driving means.

A further object of the invention is to provide a novel arrangement wherein the measurement of elongation by the ultrahigh-speed tensile tester is effected in such a manner that a brightness modulation signal which indicates the value of elongation of the test piece is produced by utilizing the rotary driving disc, the electrical pulse of said signal being either fed to an oscilloscope thereby to spot it in the form of a black or bright spot on the stress-strain curve or being counted by a counter to effect D-A conversion (digital to analog conversion), thus automatically indicating the measured value of elongation.

Still a further object of the invention is to provide an automatic measuring procedure circuit for obtaining safety and reliability of measurement in the present ultrahigh-speed tensile tester.

The above and other numerous objects of the invention will be apparent from the following description when taken in conjunction with the accompanying drawings, in which.

Figure 1:
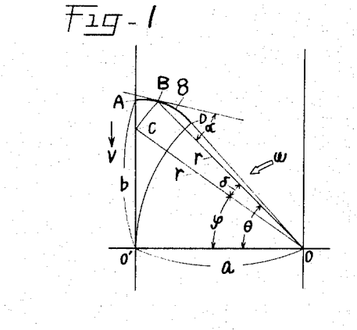
FIG. 1 illustrates a method of deducing or developing a driving curve to be formed on a cam mounted on a rotary driving disc.

Referring to the drawings, FIG. 1 illustrates a method of introducing or developing a driving curve to be formed on a rotary disc in order to transform uniform angular motor to uniform linear motion. Such a driving curve for maintaining uniform velocity to obtain a stroke suited for the degree of stretch of highly stretchable materials such as rubber is deduced from the following theory.

In FIG. 1, let the center O of the rotary disc be the origin of polar coordinates, $\overline{AO'}$ be the direction of pull, $b$ be a distance $AO'$ representing a drive stroke, $a$ be a distance $OO'$ from the center O to a straight line $\overline{AO'}$, and $\overset{\frown}{AD}$ be a driving curve 8 to be found. In the figure, it is assumed that the driving curve $\overset{\frown}{AD}$, which is to be found and formed on the cam mounted on the rotary disc, will rotate anti-clockwise around the center O at a uniform angular velocity $\omega$. Then, the front end of a movable holder pulling the specimen will be hooked at A on the curve and driven at velocity $v$ towards $O'$ along a guide (concurrently along the driving curve $\overset{\frown}{AD}$). The purpose here is to obtain the shape of the curve $\overset{\frown}{AD}$. Referring to the uniformity of velocity, if a radius vector $r$ with a certain angle $\theta$ forming the curve $\overset{\frown}{AD}$ is considered, then the condition of the uniformity of velocity may be expressed as follows. Assuming that the front end B of the radius vector $r$ reaches the straight line $\overline{AO'}$ at the end of a certain time $t$ and the reached point is denoted at C, the front end A of the movable holder pulling the specimen must reach the point C at the end of that time $t$ at velocity $v$. Thus, $$\overline{AC} = vt = b - \sqrt{r^2 - a^2}$$

$$\therefore t = \frac{1}{v}\{b - \sqrt{r^2 - a^2}\}$$

On the other hand, if the angular velocity of the driving curve is represented by $\omega$, $$\delta = \omega t = \frac{\omega}{v}\{b - \sqrt{r^2 - a^2}\}$$

also, $$\theta = \delta + \varphi \text{ and } \varphi = \left|\cos^{-1}\frac{a}{r}\right|$$

therefore, $$\theta = \frac{\omega}{v}\{b - \sqrt{r^2 - a^2}\} + \left|\cos^{-1}\frac{a}{r}\right| \quad \text{(I)}$$

where $$a \leq r \leq \sqrt{a^2 + b^2}$$

This is the formula of the driving curve based on the polar coordinates introduced under the condition of uniformity of velocity, it being seen that with the formula in the form as indicated, a number of driving curves producing the required linear driving speed $v$ would be obtained, since $\omega$ may be selected to be anyone of a number of values.

Now consider vertical driving. Vertical driving means that at the location where the driving curve $\overset{\frown}{AD}$ abuts against the front end of the movable holder pulling the specimen, i.e., at the point where it crosses the straight line $\overline{AO'}$, the normal line thereof coincides with the line $\overline{AO'}$ and thus the driving curve vertically urges the front end of the movable holder pulling the specimen, a fact which indicates the most effective use of the driving force. This condition may be expressed as follows:

The angle $\alpha$, which a tangent line at the point B on the driving curve $\overset{\frown}{AD}$ forms with the radius vector $r$, must be equal to an angle $\varphi$. In other words, when the point B on the driving curve $\overset{\frown}{AD}$ reaches the point C on the straight line $\overline{AO'}$ at the end of a certain time, its tangent line must be at right angles with the straight line $\overline{AO'}$.

According to differentiation in the polar coordinate system, $$\tan \alpha = -r\frac{d\theta}{dr} = -r\frac{d}{dr}\left[\frac{\omega}{v}\{b - \sqrt{r^2 - a^2}\} + \left|\cos^{-1}\frac{a}{r}\right|\right]$$

$$= r\left[\frac{\omega}{v}\frac{r}{\sqrt{r^2 - a^2}} - \frac{a}{r^2\sqrt{1-\left(\frac{a}{r}\right)^2}}\right]$$

$$= \frac{1}{\sqrt{r^2 - a^2}}\left(\frac{\omega r^2}{v} - a\right)$$

On the other hand, since $\varphi$ must be equal to $\alpha$ and since $$\tan \varphi = \frac{\sqrt{r^2 - a^2}}{a}$$

then $$\tan \alpha = \tan \varphi = \frac{\sqrt{r^2 - a^2}}{a} = \frac{1}{\sqrt{r^2 - a^2}}\left(\frac{\omega r^2}{v} - a\right)$$

$$\therefore \frac{\omega}{v} = \frac{1}{a}$$

which, when substituted in Formula I, gives $$\theta = \frac{1}{a}\{b - \sqrt{r^2 - a^2}\} + \left|\cos^{-1}\frac{a}{r}\right|$$

$$= \frac{b}{a} - \sqrt{\left(\frac{r}{a}\right)^2 - 1} + \left|\cos^{-1}\frac{a}{r}\right| \text{ (radians)} \quad \text{(II)}$$

where $$a \leq r \leq \sqrt{a^2 + b^2}$$

Thus, Formula II is the driving curve expression based on polar coordinates which has been obtained under the condition of vertical driving. The shape of the driving curve may principally be determined by assigning values to $a$ and $b$ in Formula II. This is the case with driving in the second quadrant, and it is apparent that driving in the case of the third quadrant is given by a related curve which is symmetrical with respect to the straight line $\overline{OD}$.

If $a$ and $b$ in Formula II are determined, a driving curve can be prepared, with the radius vector $r$ given a value between $a$ and $\sqrt{a^2+b^2}$, which driving curve satisfies the conditions of vertical driving and of the uniformity of velocity. The present ultra high speed tensile tester comprises a driving mechanism wherein said introduced driving curve is formed on the cam surface of a cam which is mounted on a rotary disc in such a manner that the origin of polar coordinates for the curve coincides with the rotary axis of the rotary disc, said cam being urged against a pressure-receiving pin provided on a movable holder thereby to drive the latter along a linear guide parallel with the rotary disc surface.

Figure 2:
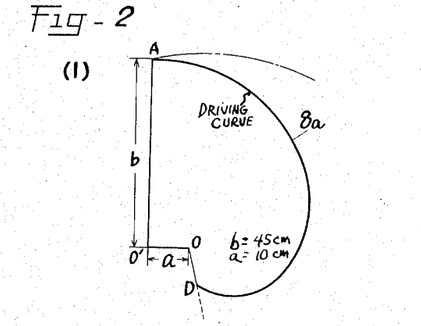
FIG. 2 shows some examples of the curves produced according to a formula developed from FIG. 1.

FIG. 2 shows embodiments of the curves prepared from the Formula II, where $b=45$ cm. for which $a=10$ cm. (FIG. 2(1), 25 cm. FIG. 2(2), and 45 cm. FIG. 2(3), respectively.) Since all these three forms are the result of curves which are symmetrical with each other with respect to the line OD, i.e., they are the result of curves which are concave and convex with respect to the direction of rotation of the rotary disc, a combination of cams whose curves are concave driving curves 8a, 8b and 8d and convex driving curves 8c and 8e with respect to the direction of rotation of the rotary disc, respectively, makes it possible to double the stroke with a single common disc used. In this embodiment, the curves symmetrical with each other with respect to the line OD are formed on the cam surfaces of two cams which are mounted on a rotary disc in such a manner that the origin of polar coordinates for the curves coincides with the rotary shaft of the rotary disc. The formation of various curves for obtaining the same stroke is made possible by varying the distance $a$. As illustrated in FIG. 2, when $a=10$ cm., the curve $\widehat{AD}$ becomes very long and necessitates the use of a large cam resulting in the formation of a large friction surface, a fact which is rather undesirable, while when $a=45$ cm., the curve $\widehat{AD}$ becomes very short as compared with the increase in radius $\overline{OA}$ so that the same stroke can be obtained by a very small cam; therefore a curve as similar thereto as possible will be desirable for use with the ultra high speed tensile tester. Further, it is so arranged that the front end A of the driving curve is positioned on the circumference of a circle with a radius of $\sqrt{a^2+b^2}$ having its center coinciding with the center O of the rotary disc, irrespective of the size of the rotary disc used.

Figure 3:
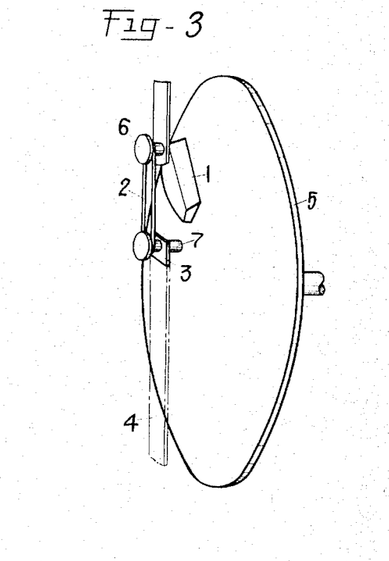
FIG. 3 is a perspective view illustrating the relation between a movable holder and a cam secured to the rotary driving disc.
Figures 4, 5, 6, 7, 8:
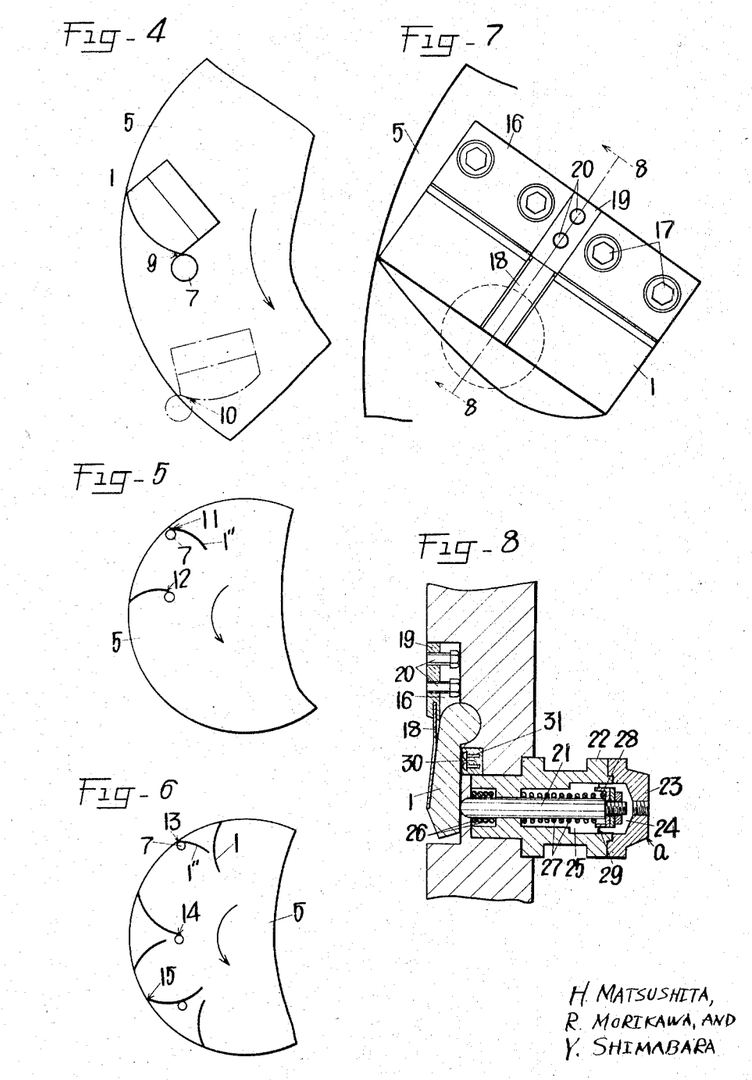
FIG. 4 illustrates the pulling action of the cam having a driving curve and mounted on the rotary driving disc.
FIG. 5 illustrates the pulling action of an embodiment of the cam having a driving curve which differs from that shown in FIG. 4.
FIG. 6 is a view illustrating the pulling action of a combination of the embodiments shown in FIGS. 4 and 5.
FIG. 7 is a detailed view showing attachment of the cam to the rotary driving disc.
FIG. 8 is a cross-sectional view taken along line 8—8 in FIG. 7.

FIG. 3 shows the relation between the cam retractably mounted on the rotary disc and the movable holder. The cam 1 is retractably mounted on the rotary disc 5 as shown in FIGS. 7 and 8, and the cam surface of the cam is provided with a driving curve obtained from the aforementioned Formula II, in such a manner that the origin O of polar coordinates for the curve coincides with the rotary axis of the rotary disc, said cam being rotated at high speed together with the rotary disc. The specimen 2 is held by fixed and movable holders 6 and 3. The movable holder 3 has at its one end a pressure-receiving pin 7 subjected to a force from the cam 1. The other end of the clamp 3 is adapted to support the specimen, and the substantially central portion thereof is adapted to slide while being contacted with the guide surface of a linear guide 4. The cam 1 is caused to protrude by a diaphragm mechanism or other mechanism smoothly operable under centrifugal force. Although the ring type specimen is shown herein, a dumbbell type, film type, line type and other type specimens may easily be used by changing the shape of the fixed and movable holders 6 and 3. As mentioned above, the pressure-receiving pin 7 of the movable holder 3 is pushed down by the driving curve formed on the cam surface of the cam 1 mounted on the rotary disc, thereby linearly driving the specimen at uniform velocity to make a high speed tensile test.

FIG. 4 shows the pulling action of the cam 1 having a convex driving curve, wherein the cam 1 is moved from the initial driving position 9 shown in solid lines to the final driving position 10 shown in broken lines, during which the pressure-receiving pin 7 of the movable holder 3 is vertically pushed down from a solid line position to a broken line position, thereby effecting a uniform and linear driving with a stroke of the amount predetermined by the aforementioned formula.

FIG. 5 illustrates another embodiment, showing the pulling action of a cam 1″ having a driving cam surface which is concave with respect to the direction of rotation of the rotary disc, wherein the initial driving position is indicated at 11 at which the cam 1″ starts pushing the pressure-receiving pin 7 of the movable clamp 3 at the outer side end thereof, and the final driving position is indicated at 12 at which the vertical driving is thus completed.

FIG. 6 illustrates a combination of the embodiments shown in FIGS. 4 and 5, wherein a continuous driving is made possible by the combined arrangement of the cams 1 and 1″ formed with the aforementioned symmetrical curves, i.e., first and second curves which are concave and convex, respectively, with respect to the direction of rotation of the rotary disc. In the initial driving position 13 the pressure-receiving pin 7 of the movable holder 3 is initially pushed by the concave curve cam 1″ at the outer side end thereof, and in the intermediate driving position 14 it is transferred to the inner side end of the convex curve cam 1, wherefrom it is gradually shifted to the outer side end 15 thereof, thus completing the driving. This combined arrangement has the advantage that a half the radius of the single-cammed rotary disc will suffice for the same length of stroke. As mentioned above, the present ultra high speed tensile tester comprises a cam or cams formed with the aforementioned curve or curves and mounted on the rotary disc 5. The latter is rotated at the predetermined high angular velocity. At this time, the cam is flush with the disc surface and does not protrude from the face of the rotary disc. But after the rotary disc has attained a state of constant speed, the cam is quickly pushed out of the recess in the face of the disc. The pushing-out is started approximately $$\frac{3}{2}\pi$$

radians ahead of the position at which the contact between the cam and the pressure-receiving pin 7 begins. As shown in FIGS. 4, 5 and 6, upon completion of the contact the pressure-receiving pin 7 is pushed down by the cam so that the specimen is subjected to tension. Since the cam surface of the cam is in the shape of the aforementioned curve obtained from Formula II, it follows that if the rotary disc 5 executes uniform angular motion, the movable holder 3 which slides along the linear guide 4 executes uniform angular motion together with the pressure-receiving pin 7. If the friction between its pressure-receiving portion and direction and the cam surface is neglected, it may be assumed that the pressure-receiving direction coincides with the direction of movement of the movable holder 3, thereby achieving the most effective application of force. In addition, with frictional force taken into consideration, the aforementioned driving curve may more or less be corrected. In the case of this contact driving, there is a problem in connection with the impact force which will be produced upon contact of the cam against the pressure-receiving pin 7 owing to the high velocity of the rotary disc. However, it has been ascertained that this can be overcome to a practically allowable degree by providing a suitable cushioning effect and decreasing the mass of the movable clamp as much as practicable. In the present ultra high speed tensile tester, a high and uniform velocity of pull can dependably be applied to the specimen, and owing to the utilization of such curves as will effectively apply pressure forces, a considerable pull length can be obtained with a comparatively small disk. Accordingly, the tester is easy to operate and suited for tests to be made in laboratories, etc.

Figure 25:
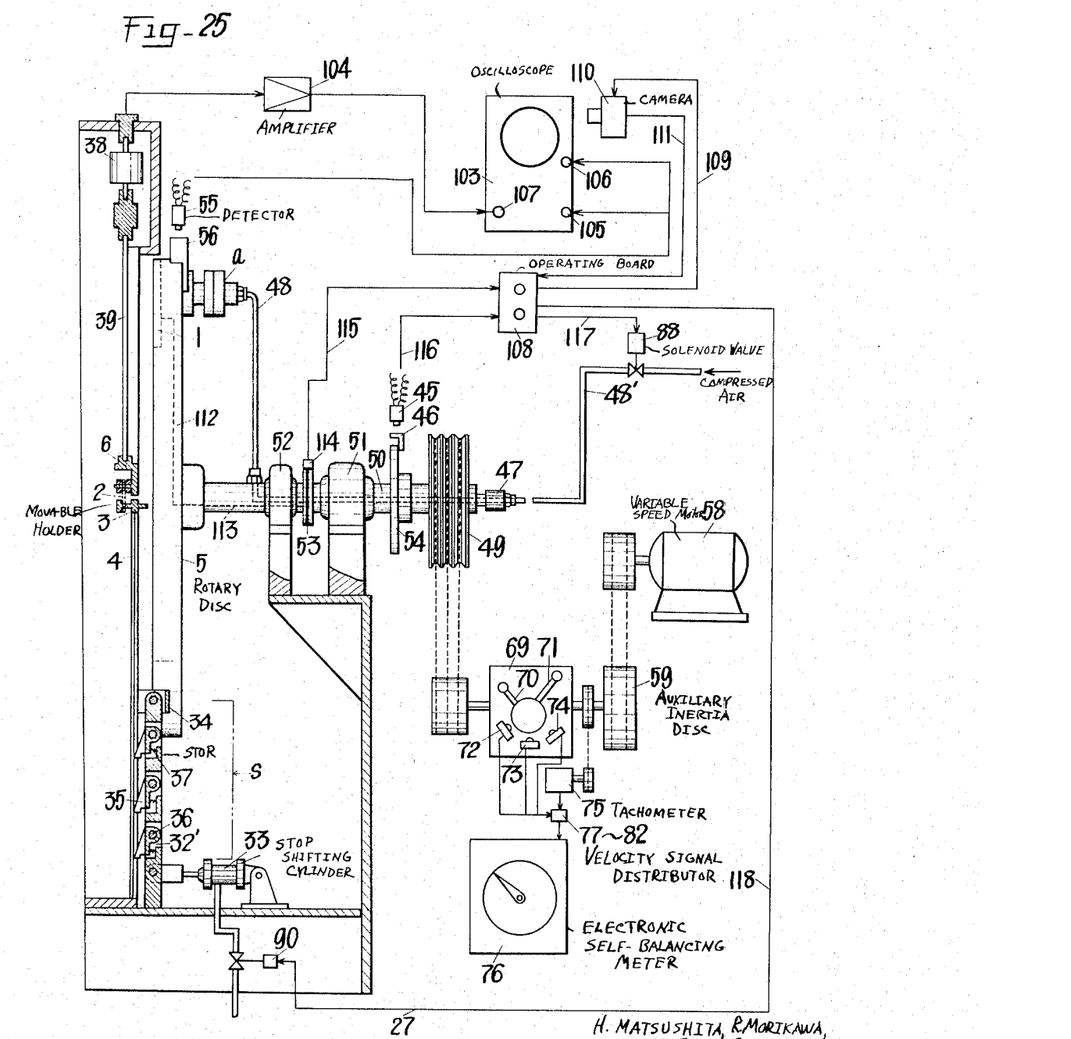
FIG. 25 is a diagram showing the automatic measuring procedure circuit and stress-strain measuring system connected with the ultrahigh-speed tensile tester, and also showing the outline of a driving mechanism therefor.

FIG. 7 shows the details of the attachment of the cam to the rotary driving disc, and FIG. 8 shows a cross-section taken along line 8—8 in FIG. 7. Since the cam 1 is mounted on the rotary disc 5 rotating at high speed, a considerable amount of centrifugal force is exerted on said cam, so that it becomes necessary to use a mechanism which smoothly functions under such centrifugal force to extend and retract the cam 1. Also, since such mechanism is attached to the rotary disc, it is necessary that the mechanism should be as light in weight and as small in size as practicable. In order to meet these requirements, a special diaphragm mechanism is employed. As shown in FIGS. 7 and 8, a spring fixing plate 19 is placed in a central recess formed in a metal mounting 16 and is secured thereto by means of set screws 20 screwed thereinto from the rear side of the metal mounting 16. The spring fixing plate 19 fixes a spring 18 by means of which the cam 1 is strongly urged into and held in the rotary disc 5. A diaphragm mechanism (a) serving as means for extending and retracting the cam 1 during the rotation of the rotary disc 5 is inserted into the rotary disc 5 from the rear side thereof and secured thereto. The diaphragm mechanism (a) comprises a combination of outer cylinders 22 and 23 within which are disposed air chambers 24 and 25, a rod 21, ball bushing 26, spring 27, diaphragm 29 and other members, as shown, said rod 21 serving to extending the cam 1. A metal mounting 28 serves as a guiding cylinder for the diaphragm 29. The diaphragm 29 is fixed along the metal mounting 28, with the outer edge of said diaphragm held between the outer cylinders 22 and 23. The diaphragm is made of a flexible material. In the case it is made of rubber, it is reinforced with fibrous material. The rod 21 is provided at its front end with the ball bushing 26, thereby facilitating the actuation thereof. Since the rotary driving disc 5 is rotated at high speed, a very high centrifugal force (corresponding to, for example 400 g.) will be exerted on the cam-extending and retracting means. In order to decrease the friction on the rod 21 due to such centrifugal force and also the load on the ball bushing 26, the rod 21 is hollow or is made of a material of low specific gravity such as an aluminium alloy. Further, in order to prevent the balls of the ball bushing 26 from cutting into the rod 21, the latter is provided with a sleeve made of a material of high hardness fitted thereon. The returning of the cam 1 must be effected against the friction on the rotary shaft of the cam 1 and against the rolling friction between the ball bushing 26 and rod 21. Since these frictions are greatly increased by centrifugal force, the strength of the return spring 18 must be very high. On the other hand, the force required for extending the cam 1 must overcome the resistance of the return spring 18 besides said frictions. Further, it is required to complete the extending of the cam 1 within a space of time corresponding to less than one complete turn of the rotary disc 5 (for example, within 0.05 sec.). Thus, the effective pressure-receiving area for actuating the diaphragm must be very large. But it is not desirable to make such area excessively large, since this would result in increasing the size of the air chamber 24, thus causing a capacity lag and an increase in centrifugal force. With these factors taken into consideration, the device has an effective diameter of about 40 mm. It is so arranged that compressed air is introduced through a conduit attached to the outer cylinder 23 to actuate the diaphragm 29, and when the air is discharged the cam 1 is returned to its original position by the return spring. It is advisable to give further consideration to an unexpected failure in actuation. From the view point of safety, it is dangerous to prepare the next measurement (i.e., to bring the movable holder 3 to the position in which it hooks the specimen 2) before the retraction of the cam 1 to its original position is completed. Further, it is impossible to ascertain such completion with the eye owing to the high speed of the rotation. Therefore, in order to overcome these problems, there is provided an arrangement as shown in FIG. 8, wherein when the cam 1 is completely returned to its original position two contractors 30, 31 are electrically short-circuited thereby lighting a signal lamp and forming an interlock circuit in a measuring preparation circuit. That is, as shown in FIG. 25, the movable holder 3, when quickly pushed down, is allowed to engage the stopper s upon fracture of the specimen 2 thereby preventing resilient movement thereof, but a stopper shifting cylinder 33 for allowing escape of the stopper s when it is desired to lift the movable clamp 3 for the next measurement will not be actuated unless the cam 1 is retracted to its original position.

Figure 9:
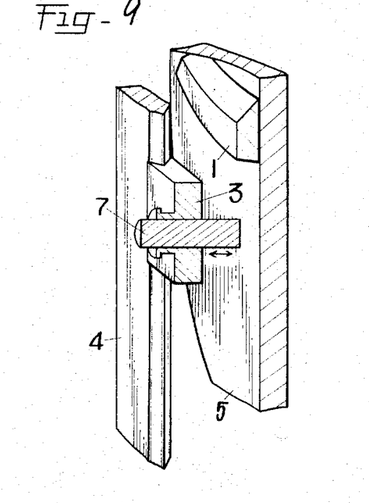
FIGS. 9, 10, 11 and 12 are perspective views of other embodiments for establishing contact between the movable holder and the cam mounted on the rotary driving disc.
Figure 10:
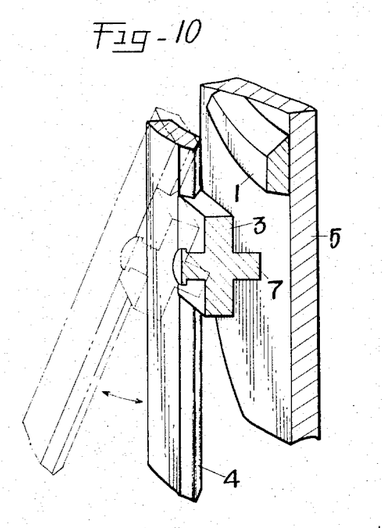

The system shown in FIG. 9 is such that the pressure-receiving pin 7 is adapted to be extended and retracted, said pressure-receiving pin 7 being extended by being knocked, so that the mechanism is easy to operate without the need of operating the cam. The system shown in FIG. 10 is so adapted that the linear guide allowed to move laterally is advanced to the predetermined position as soon as it is desired to effect pulling. This system does not require operating the cam 1 and pressure-receiving pin 7 and is simple in structure as compared with the system shown in FIGS. 3 and 9.

Figure 11:
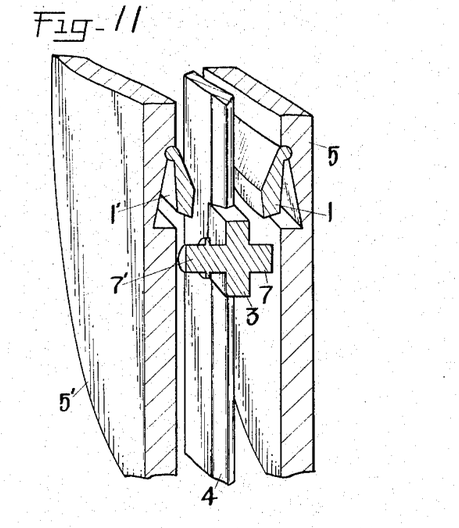

While the aforementioned systems will each exert a couple of forces at the time of pulling, the system shown in FIG. 11 is a two-disc type avoiding exertion of a couple on the movable holder 3 to assure a positive application of pull. This figure shows cams 1, 1', movable holder 3, linear guide 4, rotary discs 5, 5', said movable holder 3 being placed between said rotary discs 5 and 5'. In this case, the movable holder 3 is provided with pressure-receiving pins 7, 7'. The driving of the movable holder 3 is effected by extending and retracting the cams 1 and 1' by means of a diaphragm mechanism or the like.

Figure 12:
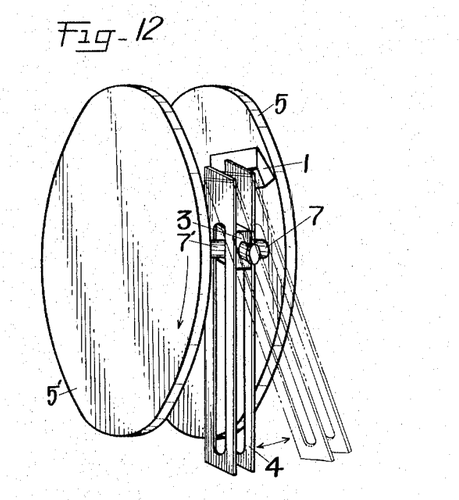

FIG. 12 shows a two-disc system which is similar to that shown in FIG. 11 but which is operated by extending and retracting the linear guide 4 as in the case of FIG. 10.

Figure 13:
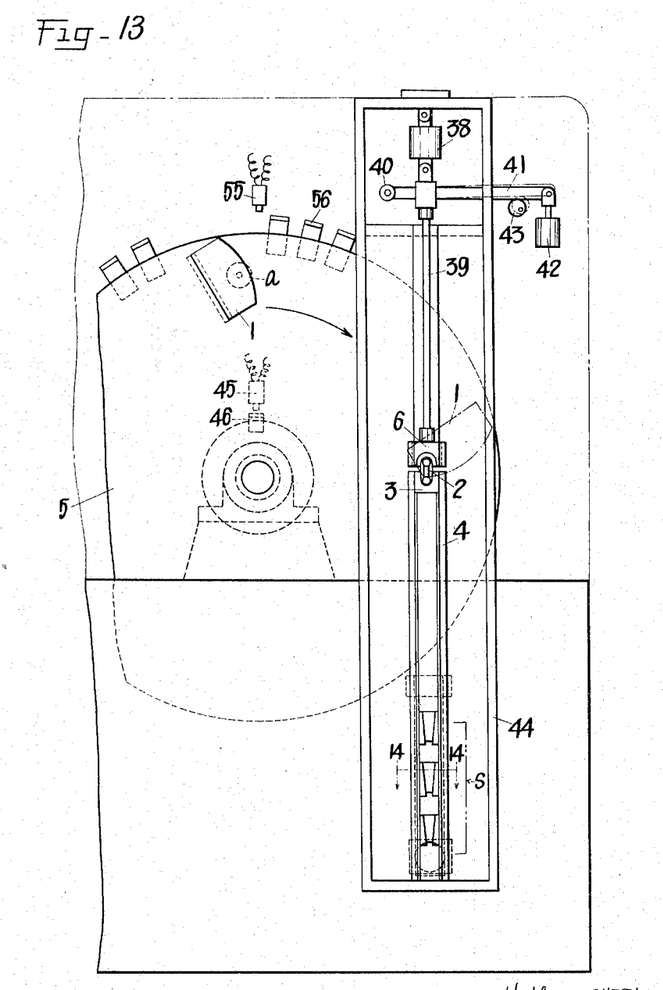
FIG. 13 is a front view of the principal parts of an ultrahigh-speed tensile tester.

FIGS. 13 and 25 show the principal parts of the ultra high speed tensile tester. Retractably attached to a rotary driving disc 5 rotated at high speed is a cam 1 having a driving curve introduced from FIG. 1. The cam 1 is extended by the aforementioned diaphragm mechanism (a). The rotary disc 5 is secured to a shaft 50 supported by bearings 51 and 52. A pulley 49 is connected to wide speed range uniform driving means to be described later, and drives the rotary disc 5. Projections 46 mounted on a plate 54 attached to the shaft are opposed to a detector 45. The plate 54 is attached to the shaft in such a position that the extending operation of the diaphragm mechanism (a) can take place $$\frac{3}{2}\pi$$

radians before the contact between the cam 1 and the pressure-receiving pin 7 of the movable holder 3 begins, i.e., at a position sufficiently ahead of the pull-starting position. A signal from the detector 45 is transmitted to a solenoid valve, which is thereby caused to assume an "ON" position, whereupon compressed air is supplied to the diaphragm mechanism (a) through a rotary coupling 47 and a conduit 48, thereby extending the cam 1. When the test is finished, a time delay relay mounted on an operating board is actuated to cut off the signal to the solenoid valve, so that the supply of compressed air to the diaphragm mechanism (a) is cut off to return the cam 1 to its original position. When the cam 1 is completely returned, the electrical contacts 30 and 31 (FIG. 8) are short-circuited and connected to the interlock circuit in the measuring preparation circuit with the aid of a spring 53, thereby providing for the next measurement. The specimen 2 is supported by means of the fixed and movable holders 6 and 3. The movable holder 3 is movable along the linear guide 4. The latter is provided at its lower portion with a stopper (s) for preventing the resilient movement of the movable clamp 3, which will descend under the influence of inertia force upon fracture of the specimen. The fixed holder 6 is connected to a load cell 38 through a connecting rod 39. The output of the load cell 38 is amplified by an amplifier and is then fed to a synchroscope for measuring the stress of the specimen.

Attached to the lower portion of the load cell 38 is a standard weight 42 supported by a fulcrum 40, lever 41 and eccentric cam 43. The load cell can be adjusted by rotating the eccentric cam.

Figure 14:
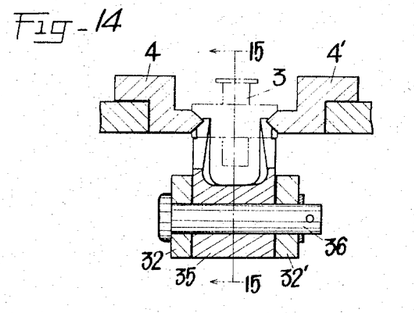
FIG. 14 is an enlarged sectional plan view of a stopper, taken along line 14—14 in FIG. 13.
Figure 15:
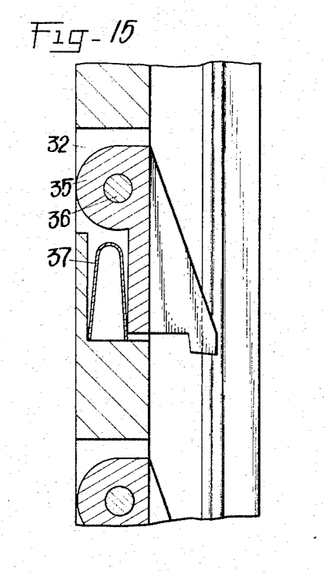
FIG. 15 is an enlarged vertical sectional view of the stopper taken on line 15—15 of FIG. 14.

The strain of the specimen is measured by a pulse train from a detector 55 opposed to projecting portions 56 arranged on the circumference of the rotary disc at intervals of unit length for pulling which pulse train is fed to the trigger terminal and the brightness modulation terminal of the synchroscope. In this case, the pulse train becomes graduation per unit length by brightness modulation at the same time of triggering of X axis sweeping. As shown in FIGS. 13, 14 and 15, the stopper (s) comprises a support 34 mounted on the lower rear surface of the linear guides 4 and 4', supporting plates 32 and 32' movably attached to the support 34, a rebound-preventing tooth 35 attached to the supporting plates 32 and 32' by means of a bolt 36, and a spring 37 causing the tooth 35 to project outwardly of supporting plates 32 and 32'. Upon fracture of the specimen the movable holder 3 pushes the front end portion of the rebound-preventing tooth 35 back in order to reach a lower position, whereupon the tooth 35 returns to its original position under the action of spring 37 thereby preventing the rebound movement of the movable holder 3. A shock absorber or absorbing device is provided on the lowermost portion of the linear guide for absorbing the energy possessed by the quickly descending movable holder 3. The material of the rebound-preventing tooth 35 is selected based on consideration of preventing damage and noise. Metal, plastics, or rubber, plastics or the like lined material may be used therefor. In order to start the next measurement, it is necessary to release the stopper (s) so as to lift the movable holder 3 which has descended. The advance and retraction of the entire stopper (s) are effected by a cylinder 33 acting as a stopper-shifting device. The stopper is released by depressing a stopper release push-button on the operating board to feed a signal to the solenoid valve to introduce compressed air into the cylinder. The movable holder is thus allowed to be lifted for mounting the next specimen. In this case, unless the cam 1 is completely returned to its original position, the depressing of the push-button will not cause the signal to be fed to the solenoid valve, so that the stopper is not released and the movable holder 3 cannot be lifted. For this purpose, the interlock circuit is provided to protect the operator against injury, as will hereinafter be described in more detail. While an air cylinder has been used in this embodiment, other suitable means such as a magnet may be used, or the operation may be manually effected.

Besides high speed driving means, wide speed range uniform driving means capable of driving over a range of speeds from high to low speeds are provided for driving the present tester.

Conventional testers were each restricted to their respective narrow ranges of tension speed, and did not provide means for securing the uniformity of velocity covering a range from low to high speed values. The present tensile tester has a very wide range of tension speed (for example, 0.1 m./s.–30 m./s. or more). Further, it is provided with driving means adapted to substantially secure uniformity of velocity, the fluctuations of tension speed being restricted to a certain range, thus making it possible to conduct tests at speeds ranging from high to low values. In the ultra high speed tensile tester, the tension speed in the case of high speed test can be controlled to have an allowable fluctuation. However, when it is operated at a low speed within the speed limits, the uniformity of velocity would not be expected as far as a rotary driving disc and a variable motor associated with the tester are concerned.

The means for obtaining the uniformity of velocity in the whole range will now be described with reference to an example thereof.

Figure 16:
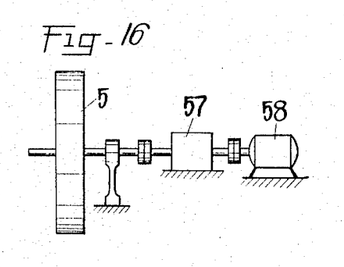
FIGS. 16 and 17 illustrate wide range uniform driving means for the ultrahigh-speed tensile tester.

Considering a driving system shown in FIG. 16 comprising a rotary disc provided with a cam having the aforesaid driving curve, a reduction gear 57 and a variable speed motor 58, the tension speed range within which the uniformity of velocity can be attained within the allowable value may be expressed as follows.

Let I represent the moment of inertia of the rotary disc 5, the energy required for breaking the specimen be 40 joules, V m./s. represent the tensile speed, the number of revolutions of the rotary disc 5 at a tension speed of 30 m./s. be 1140 r.p.m., and the allowable fluctuation of the tension speed be within 1%.

When a rotary body having a moment of inertia I (kg.-m.²) is rotated at a speed N r.p.m.), the energy E (joules) possessed by the rotary body is $$E = \frac{IN^2}{183} \quad (1)$$

Therefore, an energy $\Delta E$ discharged when the number of revolutions is decreased from $N_1$ to $N_2$ is $$\Delta E = \frac{I(N_1^2 - N_2^2)}{183} = \frac{IN_1^2\left\{1 - \left(\frac{N_2}{N_1}\right)^2\right\}}{183} \quad (2)$$

If $\Delta E = 40$ joules and $$\frac{N_2}{N_1} = 0.99$$

then $$N_1 = \sqrt{\frac{40 \times 183}{I(1 - 0.99^2)}} \quad (3)$$

Since the tension speed (V) is 30 m./s. at 1140 r.p.m., we obtain $$N_1 = \frac{1140}{30}V \quad (4)$$

From Formulas 3 and 4, we obtain $$V = \frac{30}{1140}\sqrt{\frac{40 \times 183}{I(1-0.99^2)}} = \frac{1}{38}\sqrt{\frac{7320}{I \times 0.02}} = \frac{16}{\sqrt{I}} \quad (5)$$

Formula 3 gives a way to find the number of revolutions $N_1$ such that when a rotating body having a moment of inertia I has discharged an energy of 40 joules the rotative speed is decreased by 1%. Formula 5 expresses the tension speed V instead of $N_1$. Thus, the greater the V becomes, the less the value of the moment of inertia I which suffices to meet the conditions. That is, for a constant value of I, the fluctuation of tensile speed is maintained at a value of less than 1% when V is in the limits determined by $$V \geq \frac{16}{\sqrt{I}} \quad (6)$$

If the rotary disc is made of iron, having a diameter of 710 mm. and a thickness of 50 mm., then $I \approx 5$ kg.-m.². Thus, $V \geq 7.2$ m./s. On the other hand, supposing that the quick response of the mottor 58 (i.e., the load variation time in which the motor can follow, with the variation in the number of revolutions limited to below 1%, when the load is uniformly increased from 0% to 100%) is 0.2 second and the elongation of the rubber at the time of fracture is 0.2 m., a fluctuation of less than 1% is assured within the tension speed limits of $$V = \frac{0.2}{0.2} = 1 \text{ m./s.}$$

Figure 17:
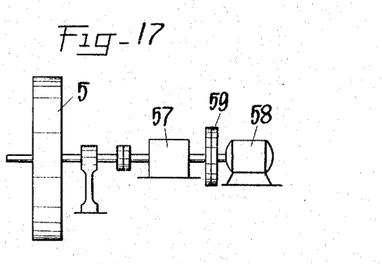
Figure 18:
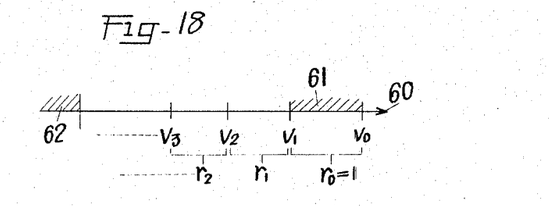
FIG. 18 shows a tension speed range within which the uniformity of tension speed can be assured with respect to each element of the wide range uniform driving means.

Thus, it follows that within the tension speed limits of less than 7.2 m./s. and greater than 1 m./s. the uniformity of velocity cannot be expected. Thus, for a driving system, let us consider an arrangement comprising a variable speed motor 58, an auxiliary inertia disc 59 and a multi-step reduction gear 57, as shown in FIG. 17. If the moment of inertia of the auxiliary inertia disc 59 is represented by $I_a$ and the reduction ratio of the multi-step reduction gear 57 by $r_i$ ($i = 0, 1, 2, 3 \ldots$), then $r_i^2 \cdot I_a$ is added to the moment of inertia 5 kg.-m.², of the rotary disc 5. In FIG. 18, an axis 60 denotes tension speed, and 61 denotes a tension speed range in which a 1% tension speed uniformity can be assured by the rotary disc 5 alone. Similarly, 62 denotes a tension speed range in which a 1% tension speed uniformity can be assured by the quick response of the motor. $r_0$, $r_1$, $r_2$ . . . denote reduction ratios. $V_0$, $V_1$, $V_2$ . . . denote tension speeds at the respective reduction ratios when the number of revolutions of the motor is increased to its maximum. Now, let us study under these conditions what values should be selected for the moment of inertia $I_a$ of the auxiliary inertia disc 59 in order to achieve 1% tension speed uniformity over the whole range.

From Formula 5, $$I = \left(\frac{16}{V}\right)^2 \quad (7)$$

Figure 19:
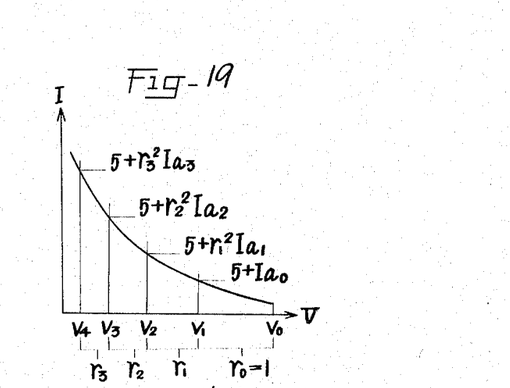
FIG. 19 is a curve showing the relation among the required moment of inertia, reduction ratio and tension speed.

The relation between the required moment of inertia I expressed by Formula 7 and the tension speed V is shown by a curve in FIG. 19. $5+r_i^2 \cdot I_{ai}$ is the total result of the momen of inertia, 5 kg.-m.², of the rotary driving disc and the effect of the auxiliary inertia disc. In FIG. 19, since the motor is set at its maximum number of revolutions at $V_1$, $V_2$, $V_3$ . . . , $$V_0 = V_1 r_1 = V_2 r_2 = V_3 r_3 = \cdots$$

$$V_1 = \frac{V_0}{r_1}, \quad V_2 = \frac{V_0}{r_2}, \quad V_3 = \frac{V_0}{r_3} \quad (8)$$

From Formulas 7 and 8, $$5 + I_{a0} = \left(\frac{16}{V_1}\right)^2 = \left(\frac{16}{V_0} r_1\right)^2$$

$$5 + r_1^2 I_{a1} = \left(\frac{16}{V_2}\right)^2 = \left(\frac{16}{V_0} r_2\right)^2$$

$$5 + r_2^2 I_{a2} = \left(\frac{16}{V_3}\right)^2 = \left(\frac{16}{V_0} r_3\right)^2$$

$$5 + r_i^2 I_{ai} = \left(\frac{16}{V_0} r_{i+1}\right)^2$$

$$I_{ai} = \left(\frac{r_{i+1}}{r_1} \cdot \frac{16}{V_0}\right)^2 - \frac{5}{r_i^2} \quad (9)$$

It is satisfactory to employ the largest of the $I_{ai}$'s ($i=0, 1, 2, \ldots$).

As an example $$\frac{r_1}{r_0} = \frac{r_2}{r_1} = \frac{r_3}{r_2} \cdots = 1.47$$

When $V_0 = 30$ m./s., we have $$I_a = \left(1.47 \times \frac{16}{30}\right)^2 - \frac{5}{r_i^2}$$

At low speeds, that is, where $r_1$ is greater, $5/r_i^2$ exerts hardly any influence. Therefore, as to $I_a$ we may well consider the first term alone, thus giving some allowance for design. Thus, $I_a = 0.6$ kg.-m.². In short, in order to obtain the predetermined uniformity of velocity over a wide range of tension speeds, the stored energy of the rotary disc 5 is utilized when the speed is higher, while the dependence is placed on the power of the motor when the speed is lower, and in the middle speed range where such effects alone are not satisfactory, a suitable auxiliary inertia disc is employed which is determined by the reduction ratio of the reduction gear and by the maximum number of revolutions of the motor, thereby making it possible to make tensile tests with speed fluctuation maintained below the predetermined level over the whole range from high to low speed values.

As mentioned above, since the present invention has a very wide range of tension speeds, it is provided with means for facilitating reading of tension speeds (i.e., the number of revolutions) over the whole range and indicating them with a high accuracy.

Conventionally, in taking a continuous measurement of the number of revolutions, the three following systems have commonly been used while providing one tachometer mounted on a shaft the speed of which is to be measured.

(1) A first system in which the output of the tachometer is fed to an instrument, and the range of the instrument is manually shifted for reading, (2) a second system in which the output of the tachometer is fed to an instrument, thereby directly reading the whole range, and (3) a third system in which a tachometer provided with a speed change gear is combined with an instrument, and the speed change gear of the tachometer is shifted for reading.

Figure 20:
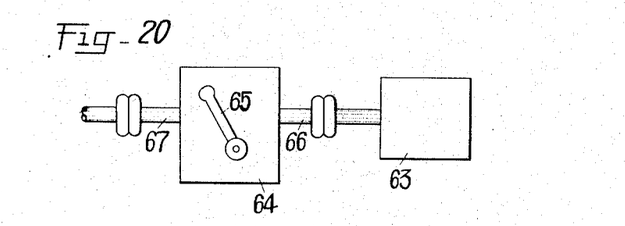
FIG. 20 is a view showing the arrangement of a rotary mechanical system the rotational speed of which is to be measured.
Figure 21:
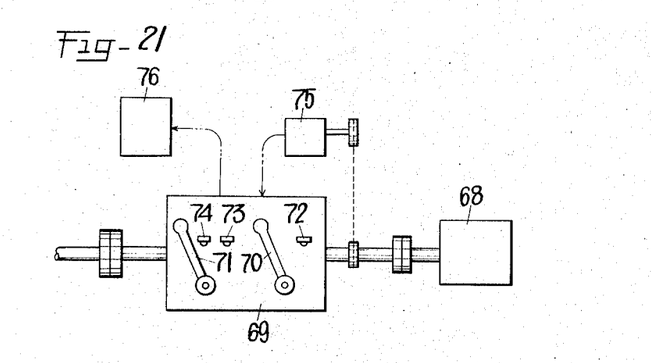
FIG. 21 shows by way of example an arrangement for the measuring system of the wide range uniform driving means.

In the systems (1) and (3), it is necessary in manual handling to pay steady attention to the range of the instrument and the number of revolutions. The system (2) has a poor accuracy. Further, the system (1) has a further disadvantage in that the characteristics of the tachometer are required to have linearity over the whole range of the number of revolutions. As shown in FIG. 20, according to the invention, the number of revolutions of the output shaft 67 of the wide range variable speed mechanism comprising a variable speed motor 63 and a multi-step reduction gear 64 is measured and indicated by an arrangement in which a rotary tachometer is mounted on the input shaft 66 of the multi-step reduction gear 64 and the generated voltage thereof is divided by means of a combined circuit of a resistor and a switch such as a microswitch adapted to be actuated in operative connection with the lever 65 of the multi-step reduction gear 64, the thus obtained divided voltage being applied to an instrument having graduations enlarging the low input of a tapped potentiometer or logarithmic function type meter. An example thereof will now be described in detail with reference to FIGS. 21 and 22. In FIG. 21, an arrangment using a six-step reduction gear 69 having three high speed steps and three low speed steps comprises a high and low speed changing gear lever 70, three step speed change lever 71, microswitch 72 adapted to be actuated when the high and low speed change lever is in low speed position, microswitch 73 adapted to be actuated when the three-step speed change lever is in its first step position, microswitch 74 adapted to be actuated when the last mentioned lever is in its second step position, rotary tachometer 75, electronic self-balancing meter 76 for indicating the number of revolutions, and variable speed motor 68.

Figure 22:
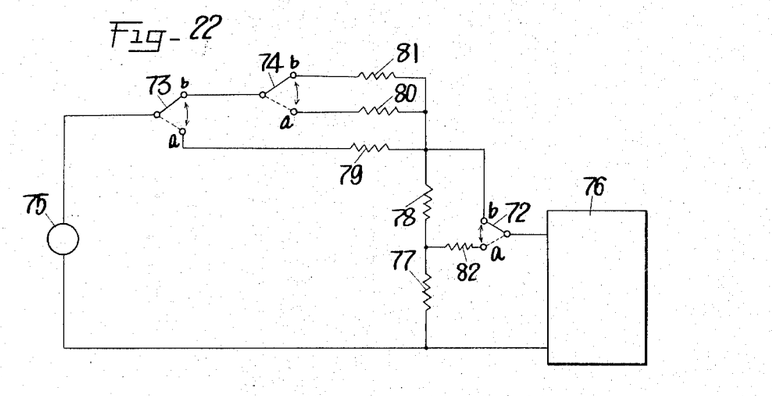
FIG. 22 is a circuit diagram of a velocity signal distributing means showing the connection of a wide range speed meter electronic self balancing meter.

FIG. 22 shows a circuit for the aforementioned arrangement, including microswitches 72, 73 and 74, resistors 77, 78, 79, 80 and 81, rotary tachometer 75, and electronic self-balancing meter 76, respectively corresponding to the members 72–76 shown in FIG .21.

The functions of the microswitches 72, 73 and 74 adapted to be shifted in operative connection with the high and low speed change lever 70 and three-step speed change lever 71 are shown in the following table.

|  | Low speed | | | High speed | | |
| --- | --- | --- | --- | --- | --- | --- |
|  | 1st step | 2nd step | 3rd step | 1st step | 2nd step | 3rd step |
| Microswitch 72 | a | a | a | b | b | b |
| Microswitch 73 | a | b | b | a | b | b |
| Microswitch 74 | b | a | b | b | a | b |

In the case, for example, of low speed, 1st step, the divided voltage supplied to the input of the electronic self-balancing meter 76 is proportional to the ratio of the value of the resistor 77 to the sum of the values of the resistors 79, 78 and 77, while in the case of high speed, 1st step, it is proportional to the ratio of the values of the resistors 78 and 77 to the values of the resistors 79, 78 and 77. But these are the cases for a variable speed gear whose number of revolutions at high speeds is a constant factor times the number of revolutions at low speeds. In addition, the resistor 82 is provided in order that the input impedance of the instrument may be substantially constant at the time of high and low speed changes, the value of said resistor being substantially the same as that of the resistor 78. According to this system, the measurement of the wide range rotative speed of a rotary system comprising a variable speed motor and multi-step reduction gear can be effected without the need of paying attention to the manually operated changing of the range of the meter. Further, it is only necessary for the rotative speed-output voltage characteristics of the tachometer to have linearity in a limited range, and thus it is possible to facilitate reading with high precision over a wide range. The system may be applied not only to a six-step reduction gear such as shown in the embodiment but also to other reduction gears having any desired number of steps.

For the preparation of the characteristic curve of the specimen according to the present tester, the following means are used.

Figure 23:
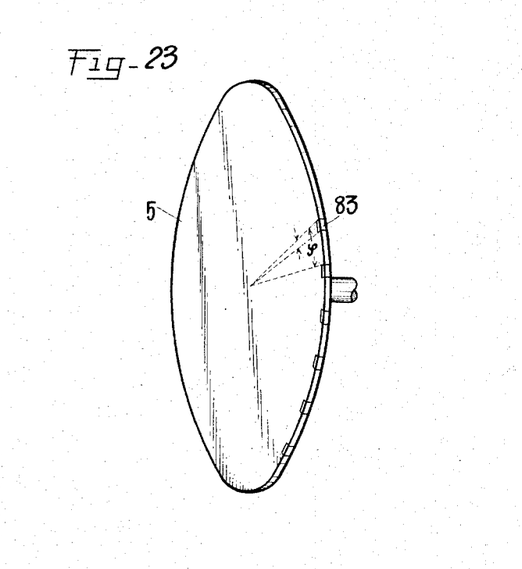
FIG. 23 illustrates a jutting portion arrangement provided on the circumference of the rotary driving disc for indicating the elongation on the stress-strain curve.

Conventional tensile testers for elastomers such as rubber had a tension speed of the order of at most 0.01 m./s. Where tests are to be made at as high a speed as several thousand times the conventional speed, there cannot be utilized the conventional system of measuring the elongation of the specimen using a potentiometer and servo motor. In an ultra high speed tensile tester in which the measurement of the elongation of the specimen is effected by the movement of a movable holder, detection with a high accuracy would generally be difficult. Thus, the present tester is so adapted that a signal which indicates the elongation of the specimen is produced by a very simple method utilizing the rotary disc and is applied to the brightness modulation terminal and trigger terminal of an oscilloscope, thereby indicating the elongation in the form of a bright or black spot on the stress-strain curve. In order to obtain a brightness modulation signal for indicating the elongation of the specimen, projecting portions 83 are arranged around the circumference of the rotary disc 5 as shown in FIG. 23. An angle indicating the distance between adjacent projecting portions is represented by $\varphi$. The member denoted at 56 shown in FIG. 13 corresponds to such projecting portion and serves to obtain a signal from the proximity switch 55 opposed thereto. Supposing the rotary disc 5 to be rotated through $\alpha$ (radians) during pulling until a stroke of $l$ (mm.) is travelled, it follows that in order to exert an output per unit pull length $\Delta l$ (mm.), $1+l/\Delta l=$projecting portions must be provided and arranged at intervals of $\varphi=\alpha/n-1$ radians. For example, if $l=250$ mm., $\Delta l=50$ mm., and $\alpha=1$ radian, then $n=6$ projecting portions are arranged at intervals of $\varphi=1/5$ radian. For obtaining such brightness modulation signal, there may be used other methods such as utilizing a commutator or photoelectric element such as a switch. Where a proximity switch is used, as an example, projecting portions 56 are provided as shown in FIG. 13, and are utilized as proximity conductors for the proximity switch 55. In this case, if the size of the projecting portion or proximity conductor 56 is excessively small, it would be rather difficult to expect good operation thereof with respect to the proximity switch 55. However, in the present ultra high speed tensile tester, such problem of size can be overcome since the circumference of the rotary disc 5 having a driving curve is utilized. For example, if the radius of the rotary disc is 355 mm. and the angle of rotation is 1 radian with respect to a stroke of 250 mm., with brightness modulation effected at intervals of 50 mm., then $\varphi=1/5$ radian so that the circumferential length thereof is 71 mm. and thus proximity conductors of sufficient size can be obtained.

When a photoelectric element is used, the projecting portions on the circumference of the rotary disc 5 will be arranged in the form of slits, so that the photoelectric element detects a beam of light emanated from a photoprojector as it passes through the jutting portion or a gap at slit or is interrupted, thereby obtaining a brightness modulation signal. In either of the aforementioned cases, the projecting portions are so arranged that when the elongation is zero, i.e., at the start of pulling a test piece, the first brightness modulation signal will be produced. The electric pulse thus obtained is connected to the brightness modulation terminal and trigger terminal of an oscilloscope, and the load signal is connected to the Y-axis. Thus, if the sweep velocity is suitably determined, on a Braun tube are obtained a stress on its ordinate and an elongation (whose starting point is zero) on its abscissa, and the actual value of measurement is marked in the form of a bright or black spot on the stress-strain curve which is very easy to observe. This method requires a predetermined sweep velocity. As a more simple method, D-A conversion (digital to analog conversion) may be utilized. In this method, a number of projections or slits are provided at intervals of very small unit angle of rotation of the rotary disc 5 over a distance greater than the stroke extending from a position corresponding to the starting point of pulling, and are detected by optical, electromagnetic or other methods. The electric pulse is counted by a counter, and the count is D-A-converted into a voltage which is then applied to the X-axis terminal of the oscilloscope and is indicated in the form of a constant length, while additionally provided projections or slits are detected by another detector, thereby resetting the counter. The previously mentioned brightness modulation method requires determination of a suitable sweep velocity of oscilloscope corresponding to tension speed. In this method, whatever the tension speed may be, the elongation is automatically indicated with the same size on the Braun tube, so that an easily observable and convenient graduation is obtained irrespective of speed.

As mentioned above, the elongation on the stress-strain curve in the ultra high speed tester can be graduated without the use of a complicated mechanism, by the very simple arrangement using slits or projecting portions provided on the circumference of a rotary driving disc provided with a cam having a driving curve.

Further, in order to achieve automatic measurement, the present ultra high speed tensile tester employs an automatic measuring procedure circuit which follows.

Figure 24:
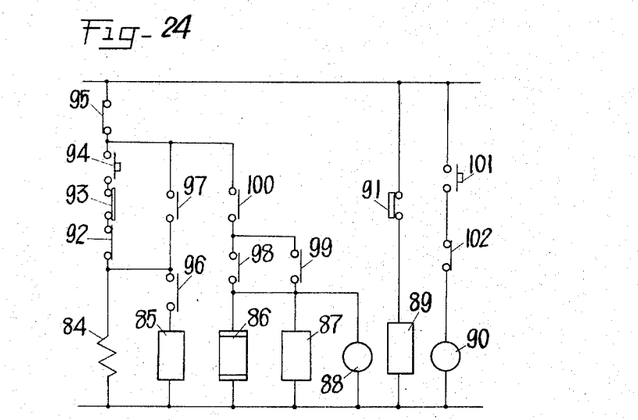
FIG. 24 is a schematic diagram of an automatic measuring procedure circuit.

It is essential that when the cam on the rotary disc rotating at high speed reaches the starting point of pulling, the cam should be completely extended. In FIG. 25, when a signal for extending the cam is fed to the solenoid valve 88, compressed air is admitted to the diaphragm mechanism (a) through the rotary coupling 47 and conduit 48, 48'; thereby extending the cam. In this case, after the signal has been fed, there may be a time delay before the completion of extension of the cam 1. Therefore, it is necessary to produce such signal as soon as the cam 1 reaches a position sufficiently ahead of the pull starting position. Further, it is also essential that, as mentioned earlier, the stopper should not be released unless the cam 1 is completely retracted and that the tensile test should not be commenced unless the shutter of a camera for photographing the stress-strain curve shown on the Braun tube is opened. An example of the circuit constructed with due consideration for such purposes is shown in FIG. 24.

The reference numeral 94 denotes a push-button switch for starting measurement, 84 the magnetic shutter of a camera, 96 the synchro contact of the camera, 93 the contact of a limit switch attached to the door 44 of the chamber (FIG. 13) in which the specimen is pulled, said contact 49 being adapted to assume its "ON" position only when the door is closed. 91 denotes a contact adapted to assume its "ON" position only when the cam is completely returned to its original position, said contact 91 corresponding to the elements 30, 31 shown in FIG. 8. 85, 86, 87 and 89 denote relays. Relay 86 is a time delay relay, the delay time thereof being selected so as to have a value greater than the time required for the rotary disc to make one complete turn when rotated at the minimum tension speed. The contact of the relay 86 is denoted at 95. The contacts of the relay 85 are denoted 97 and 100, the contact of the relay 87 is denoted at 99, and the contacts of the relay 89 are denoted at 92 and 102. 88 denotes a solenoid valve for the diaphragm for extending and retracting the cam. When the solenoid valve is in its "ON" position, compressed air is admitted to the diaphragm mechanism (a) shown in FIG. 25, thereby extending the cam 1. 90 denotes a solenoid valve for the stopper shifting apparatus 33 shown in FIG. 25. When the solenoid valve 90 is brought to its "ON" position, compressed air is admitted to the cylinder of the stopper shifting apparatus 33, thereby moving the stopper (s) to cancel the stopping action. 101 denotes a manual push-button switch for opening and closing the solenoid valve 90. 98 denotes the contact of the position-detecting proximity switch 45 shown in FIGS. 13 and 25. The member 46 shown in FIGS. 13 and 25 is a metal body for actuating the switch 45. The members 45 and 46 are so adjusted that they may be opposed to each other when the cam 1 reaches a position ahead of the pull starting position, whereupon the proximity switch 45 is actuated to provide a signal to the solenoid valve 88, thereby assuring the full extension of the cam 1 when reaching the pull starting position even if the rotary disc 5 is rotated at the maximum speed.

The function of the circuit will now be described with reference to FIG. 24.

The circuit as illustrated in FIG. 25 is in the condition when the door of the specimen chamber has been closed and the cam has been completely retracted, i.e., the phase immediately before the starting of measurement. If the door 44 of the chamber (FIG. 13) in which the specimen is pulled has been closed, the contact 93 (FIG. 24) is in its "ON" position, and if the cam has been completely returned, the contact 91 is also in its "ON" position, so that the relay 89 has been actuated and hence its contacts 92 and 102 have been closed. That is, the fact that the contacts 92 and 93 are in their "ON" positions means that everything is ready for measurement. Under these conditions, if the measurement starting push-button 94 is depressed, an electric current flows through the magnetic shutter 84 to open the shutter of the camera so that the synchro contact assumes its "ON" position.

In this case, if the camera used is of the type provided with a double exposure-preventing mechanism, the synchro contact will not assume its "ON" position unless the film has been rolled up, and therefore the next operation cannot be effected. When the synchro contact 96 assumes its "ON" position, the relay 85 is actuated to close its contacts 97 and 100. When the contact 97 is thus closed, it holds the magnetic shutter 84 and relay 85. After the contact 100 is closed and when the contact 98 of the position detecting switch assumes its "ON" position as the cam reaches the predetermined position, electric currents flow through the solenoid valve 88 for the diaphragm, relay 87, and time delay relay 86, whereby they are self-held by the contact 99. When the solenoid valve 88 for the cam extending and retracting diaphragm is actuated, pulling operation will be effected since the cam will be fully extended when it reaches the pull starting position. Since the time delay relay 86 will open its contact 95 after the lapse of a given period of time, the electric currents to the members 84–88 will be cut off, so that all parts will return to their original positions. Owing to the operation of tensile test, the movable holder has now been knocked against and stopped by the stopper, so that when it is desired to conduct the next measurement, it is necessary to push the manually operated push-button switch 101 (FIG. 24) to actuate the solenoid valve 90 for the stopper cylinder to retract the stopper, thereby allowing the lifting of the movable holder. In this case, if the cam has not been retracted to its original position, the contact 91 will not assume its "ON" position. Accordingly, since the other contact 102 of the relay 89 will not be closed, the solenoid valve 90 cannot be actuated to retract the stopper, so that the movable holder cannot be lifted. In this manner, the possibility of causing danger is excluded.

As mentioned above, with the aid of the circuit shown in FIG. 24, the ultra high speed tensile tester can take an errorless measurement and maintain safety.

The manner of embodying the automatic measuring procedure circuit and the stress-strain system in the present ultra high speed tensile tester is shown in FIG. 25, and the outline of a driving mechanism therefor is also shown therein.

The stress of the specimen is measured by amplifying by the amplifier 104 the output of the load cell 38 and supplying the same to the Y-axis terminal 107 of the oscilloscope 103. The strain is measured by supplying a pulse train emitted by the detector 55 opposed to the projections 56 arranged on the circumference of the rotary disc 5 at intervals of unit pull length, to the trigger terminal 105 and brightness modulation terminal 106 of the oscilloscope 103. In this case, the pulse train is converted to the graduation per unit length due to brightness modulation as soon as the triggering of the X-axis is effected.

The time at which the cam 1 is extended is adjusted by the positioning of the projections 46 and detector 45. That is, the projections 46 and detector 45 are so arranged that they may be opposed to each other at a position sufficiently ahead of the pull starting position of the cam 1 (the cam position shown in chain lines in FIG. 13), in anticipation of such time delay in extending the cam 1 as the operating time of the solenoid valve 88, the propagation time of compressed air, the operating time of the diaphragm mechanism (a).

When the starting push-button on the operation board 108 is depressed, the signal transmitted through the lead wire 109 causes the electromagnetic shutter of the camera 110 to be opened, whereby the synchro contact attached to the camera 110 is closed and its signal is supplied to the operating board 108 through the lead wire 111. Following the arrival of the signal from the synchro contact, when a signal from the detector 45 arrives at the operating board 108 via the lead wire 116, a signal from the operating board 108 is supplied to the solenoid valve 88 through the lead wire 117, whereby compressed air passes through the rotary coupling 47 and conduit 48 into the diaphragm mechanism (a), thus extending the cam 1. In the case of this starting, it is so arranged that the depressing of the starting push-button will not cause the opening of the shutter of the camera 110 unless the cam 1 is in the completely retracted position or the door of the chamber in which the specimen is pulled is closed. That is, the cam 1 is provided with the contacts 30 and 31 (FIG. 9) adapted to be closed only when the cam 1 is in the completely retracted position. A signal showing whether the contacts are opened or closed is transmitted through the lead wire 112, 113 slip ring 53, brush 114 and lead wire 115 to the operating board 108.

Upon fracture of the specimen, the movable holder 3 moves over the rebound-preventing tooth 35 of the stopper (s) under the influence of its inertia and stops there. The supply of the signal to the solenoid valve 88 is cut off by the time delay relay mounted on the operating board 108 a certain time after the test is finished, so that the supply of compressed air to the diaphragm mechanism (a) is also cut off and the compressed air existing therein is discharged, whereby the cam 1 is returned to its original position. The next measurement may be started by depressing the stopper-releasing push-button to supply a signal to the solenoid valve 90 through the lead wire 118 to admit compressed air to the stopper-shifting cylinder 33 thereby releasing the stopper (s) and lifting the movable holder to allow the mounting of the next specimen. In this case, it is so arranged that unless the cam 1 has not been completely returned to its original position, the depressing of the stopper-releasing push-button will not allow the signal to reach the solenoid valve 90 to release the stopper, so that the movable holder 3 cannot be lifted, thus assuring safety. These procedures are such as shown in detail in the aforementioned automatic measuring procedure circuit. As has previously been described in detail in the paragraphs referring to the wide speed range uniform driving means and the measurement of wide speed range rotative speed, the driving of the rotary disc and the measurement of rotative speed are effected by the system comprising the variable speed motor 58 and multi-step reduction gear 69. The energy required for pulling the material is supplied from the rotary disc 5 when the tensile speed is high; from the auxiliary inertia disc 59 when it is medium; and from the variable speed motor 58 when it is low. The indicating of tension speed is achieved in such a manner that the output voltage of the tachometer 75 mounted on the input shaft of the multi-step reduction gear 69 is divided by the resistor network 77–82 and micro switches 72, 73 and 74 operatively connected to the levers 70 and 71 of the multi-step reduction gear 69 and the divided voltage is then supplied to the electronic self-balancing meter 76.

What is claimed is:

1. An ultrahigh-speed tensile tester for testing elastomer materials, comprising a rotary disc, means coupled to said disc to rotate said disc, a fixed specimen holder, a load cell to which the fixed holder is connected, a movable specimen holder having a pressure-receiving pin thereon, a linear guide extending parallel with the plane of the rotary disc and along which said movable specimen holder is movable, a cam retractably mounted on the rotary disc and adapted to contact said pin and having a cam surface with a shape for driving the movable holder at a constant speed, projecting portions positioned around the circumference of the rotary disc at intervals corresponding to a given angle of rotation over the distance ranging from a position corresponding to the starting point of pulling of the specimen to a position in the vicinity of the place where the stroke of pulling is completed, an oscilloscope to which the output of said load cell is coupled for representing the stress-strain vs. time curve, and means responsive to the passage of said projecting portions adjacent said disc for producing an electrical signal train made up of a pulse for each projecting portion which has passed said means, said means being coupled to the oscilloscope for graduation marking the elongation by an indicator mark on the curve produced on the oscilloscope.

2. An ultrahigh-speed tensile tester as claimed in claim 1 wherein said cam is extended out of and retracted into said disc laterally of said disc, and means on said disc for extending and retracting the cam and comprising a diaphragm mechanism fitted on the side of the rotary disc opposite that from which the cam is extended, a ball bushing in said disc, a hollow rod supported in the ball bushing, a hard sleeve around the hollow rod and positioned in the bushing, one end of the rod bearing against the cam, the other end of the hollow rod being in an air chamber in the diaphragm mechanism, a diaphragm in said air chamber on which said rod is mounted, means connected to the chamber for supplying compressed air for moving the rod to extend the cam, a proximity switch on the shaft, a compressed air conduit coupled to said chamber, a solenoid valve in said conduit, and means coupled between said proximity switch and said solenoid for supplying an electrical signal from the proximity switch to the solenoid.

3. An ultrahigh-speed tensile tester as claimed in claim 1 wherein the pressure-receiving pin is retractably mounted on the movable holder, and means on the movable holder for extending the pressure-receiving pin prior to the start of pulling of the specimen to allow the same to be abutted by the extended cam on the rotary disc, thereby pulling the movable holder.

4. An ultrahigh-speed tensile tester as claimed in claim 1 wherein the linear guide positioned parallel with the rotary disc is retractably mounted, and means coupled to the linear guide for extending the linear guide to a position parallel with the rotary disc prior to the starting of pulling of the specimen to allow the cam to abut against the pressure-receiving pin on the movable holder thereby pulling the movable holder.

5. An ultrahigh-speed tensile tester as claimed in claim 1 and further comprising a second rotary disc provided with a cam and positioned on the other side of the movable holder from the first-mentioned, the movable holder having pressure receiving pins on both sides thereof, and means being provided for driving the discs simultaneously so that the cams on the discs abut the pressure-receiving pins simultaneously.

6. An ultrahigh-speed tensile tester as claimed in claim 5 wherein the linear guide mounted for movement out from between said discs, and means coupled to the linear guide for moving the linear guide to a parallel position prior to the starting of pulling of the specimen so that the pressure-receiving pin is abutted by the protruding cams on the rotary discs thereby pulling the movable holder.

7. An ultrahigh-speed tensile tester as claimed in claim 1 wherein the means adjacent said disc comprises a proximity switch which produces an electrical signal train made up of a pulse for each projecting portion, and means for counting the pulses of the electrical signal train and digital-analog converting the counted pulses into a voltage which is supplied to the oscilloscope and shown as the displacement on the X-axis of an oscilloscope, the stress being shown as the displacement on the Y-axis of an oscilloscope by the output of the load cell.

8. An ultrahigh-speed tensile tester as claimed in claim 1 further comprising means for indicating the wide range rotational speed comprising a single tachometer coupled to said shaft, a multi-step reduction gear to the input side of which said tachometer is coupled, a divided voltage circuit, switch means on said reduction gear for switching said circuit, a speed changing lever on the reduction gear for changing the speed thereof, said switch means being actuated by movement of said lever for divided the generated voltage of the tachometer to supply the same to the oscilloscope.

9. An ultra high speed tensile tester as claimed in claim 1 in which said cam surface is in the form of a driving curve according to the formula $$\theta = \frac{b}{a} - \sqrt{\frac{(r)^2}{a} - 1} + \left| \cos \frac{a}{r} \right|, \quad a \leq r \leq \sqrt{a^2 + b^2}$$

wherein $\theta$: an angle between a radius vector and the standard line;

$r$: a radius vector;

$a$: the distance from a locus (straight line) of the pressure-receiving point on the pressure-receiving pin provided on the movable holder to the center of the rotary disc;

$b$: the driving stroke (i.e. the distance from the initial point of contact between the cam and the pressure-receiving to the straight line which is at right angles to the locus) of the pressure-receiving point and which passes through the center of the rotary disc.

References Cited

UNITED STATES PATENTS

| 2,022,666 | 12/1935 | Hasrell et al. | 73—101 |
| 2,959,957 | 11/1960 | Smith et al. | 73—95 |
| 3,067,607 | 12/1962 | Crane et al. | 73—95 |

FOREIGN PATENTS

| 1,190,224 | 4/1965 | Germany. |
| 1,150,224 | 6/1963 | Germany. |

RICHARD C. QUEISSER, *Primary Examiner.*

J. H. WILLIAMSON, *Assistant Examiner.*